(12) United States Patent
Ho

(10) Patent No.: US 11,780,518 B1
(45) Date of Patent: Oct. 10, 2023

(54) BICYCLE STAND

(71) Applicant: Ye Chou Industry Co., Ltd., Chang Hua (TW)

(72) Inventor: Jern-Shorg Ho, Chang Hua (TW)

(73) Assignee: Ye Chou Industry Co., Ltd., Chang Hua (TW)

( * ) Notice: Subject to any disclaimer, the term of this patent is extended or adjusted under 35 U.S.C. 154(b) by 0 days.

(21) Appl. No.: 17/986,127

(22) Filed: Nov. 14, 2022

(30) Foreign Application Priority Data

Sep. 7, 2022 (TW) ................................ 111209803

(51) Int. Cl.
*B62H 3/02* (2006.01)
*B62H 3/08* (2006.01)

(52) U.S. Cl.
CPC ................. *B62H 3/02* (2013.01); *B62H 3/08* (2013.01)

(58) Field of Classification Search
CPC ... B62H 3/12; B62H 3/02; B62H 3/08; B62H 3/10
See application file for complete search history.

(56) References Cited

U.S. PATENT DOCUMENTS

| | | | | |
|---|---|---|---|---|
| 615,264 A * | 12/1898 | Du Pont | ................. | B62H 3/12 211/104 |
| 625,657 A * | 5/1899 | Elliott | ................. | A61M 25/04 604/104 |
| 648,234 A * | 4/1900 | Brown | ................. | B62H 3/12 211/19 |
| 3,883,002 A * | 5/1975 | Moore | ................. | B62H 3/08 211/21 |
| 5,749,474 A * | 5/1998 | Woodcock | ............... | B62H 3/04 211/96 |
| 9,610,993 B1 * | 4/2017 | Ho | ............................ | B62H 3/06 |
| 2007/0256989 A1 * | 11/2007 | Steadman | ................ | B62H 3/06 211/21 |
| 2013/0092643 A1 * | 4/2013 | Friemann | ................. | B62H 3/08 211/19 |

\* cited by examiner

*Primary Examiner* — Ko H Chan

(57) ABSTRACT

A bicycle stand includes a base unit, a first positioning rack, a second positioning rack, and two movable pull shaft units. The base unit includes a base and a support seat that is pivoted relative to the base horizontally. The support seat includes a pedestal and two ears. Each of the two ears has a first end connected with the pedestal and a second end provided with a limit slot. The first positioning rack includes two rods and a link. Each of the two rods is pivotally connected with one of the two ears. A first holding area is defined between the two rods. The second positioning rack is mounted on the first to positioning rack and is distant from the base unit, The second positioning rack forms a second holding area,

4 Claims, 8 Drawing Sheets

BICYCLE STAND

BACKGROUND OF THE INVENTION

1. Field of the Invention

The present invention relates to a stand and, more particularly, to a bicycle stand for placing and supporting a bicycle.

2. Description of the Related Art

A bicycle stand is used for placing a bicycle. A conventional bicycle stand comprises a suspension rack having a hook portion. In use, the bicycle has a front wheel that is directly hung on the hook portion of the suspension rack so that the bicycle is placed on the bicycle stand easily and quickly. However, the front wheel is directly hung on the hook portion of the suspension rack so that the wheel rim is easily deformed by the hook portion. In addition, when the tire valve is hooked by the hook portion, the tire valve is easily tilted or distorted, thereby causing an air leak.

BRIEF SUMMARY OF THE INVENTION

In accordance with the present invention, there is provided a bicycle stand comprising a base unit, a first positioning rack, a second positioning rack, and two movable pull shaft units. The base unit includes a base and a support seat pivotally connected with the base. The support seat is pivoted relative to the base axially and horizontally. The support seat includes a pedestal and two ears. Each of the two ears has a first end connected with the pedestal and a second end provided with a limit slot. The limit slot has an arcuate shape and has two ends each provided with a stop groove. A receiving space is defined axially and longitudinally between the two ears. The first positioning rack includes two rods and a link. The two rods are parallel with each other. Each of the two rods has a first end pivotally connected with one of the two ears of the support seat and a second end connected with the link. The first end of each of the two rods is served as a positioning end that slides upward and downward along the limit slot, and the second end of each of the two rods is served as a free end that is rotated upward and downward. The link is located between the two rods. A first holding area is defined between the two rods of the first positioning rack. The second positioning rack is mounted on the first positioning rack and is distant from the base unit. The second positioning rack includes a pivot shaft, a rotation frame, and two locating pieces. The pivot shaft is mounted on the first positioning rack and located beside the link. The rotation frame is connected with the pivot shaft. The two locating pieces are located at two sides of the rotation frame and are mounted on the pivot shaft. The rotation frame of the second positioning rack forms a second holding area. A first one of the two movable pull shaft units is mounted on a pivotal connection of the base and the support seat of the base unit, and controls and adjusts a leftward and rightward movement of the support seat relative to the base axially and horizontally. A second one of the two movable pull shaft units is mounted on a pivotal connection of the positioning end of one of the two rods of the first positioning rack and the li nit slot of one of the two ears of the support seat, and controls and adjusts an upward and downward movement of the first positioning rack relative to the support seat of the base unit axially and longitudinally.

Further benefits and advantages of the present invention will become apparent after a careful reading of the detailed description with appropriate reference to the accompanying drawings.

DETAILED DESCRIPTION OF THE INVENTION

Figure 1:
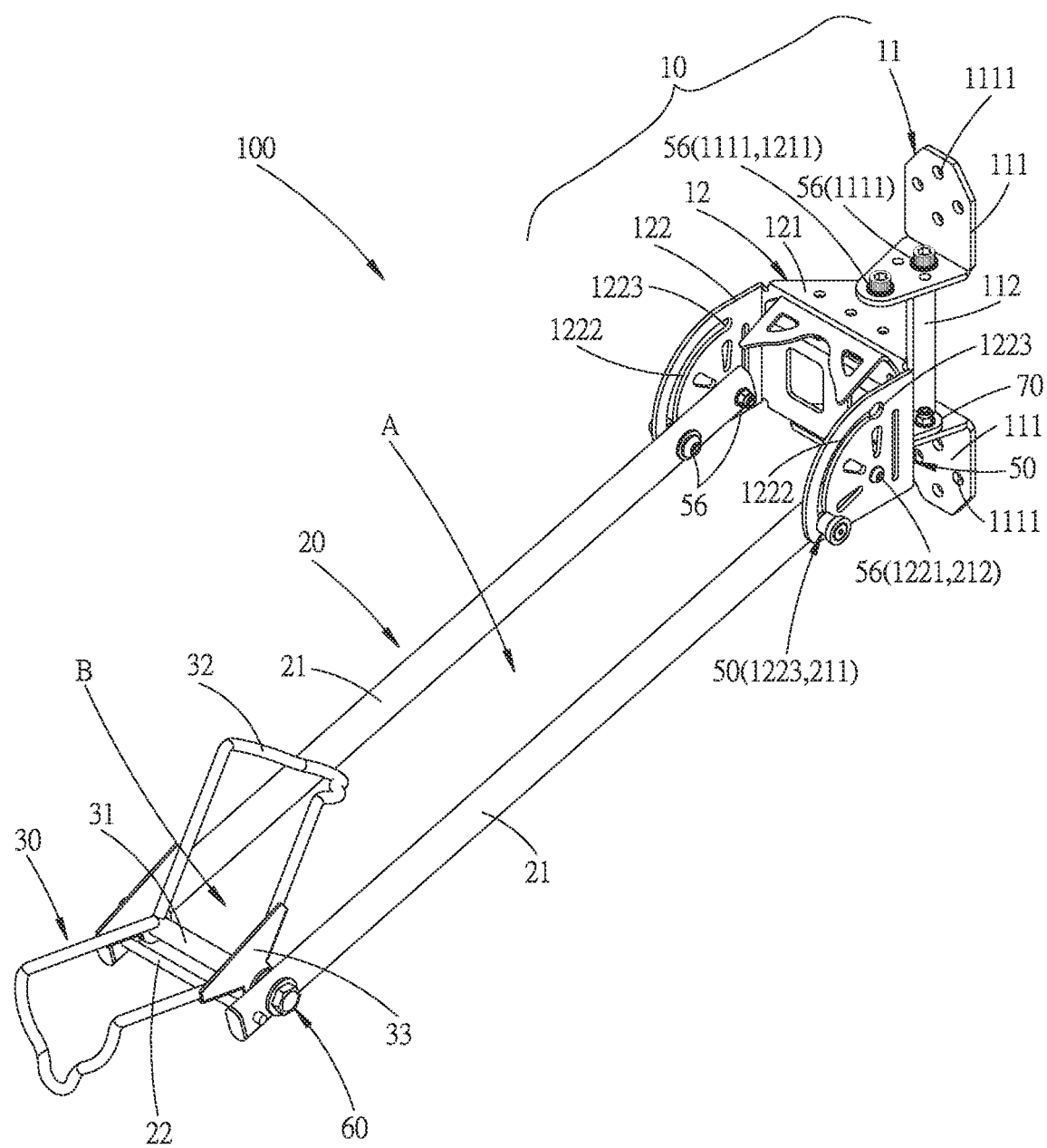
FIG. 1 is a perspective view of a bicycle stand in accordance with the preferred embodiment of the present invention.
Figure 2:
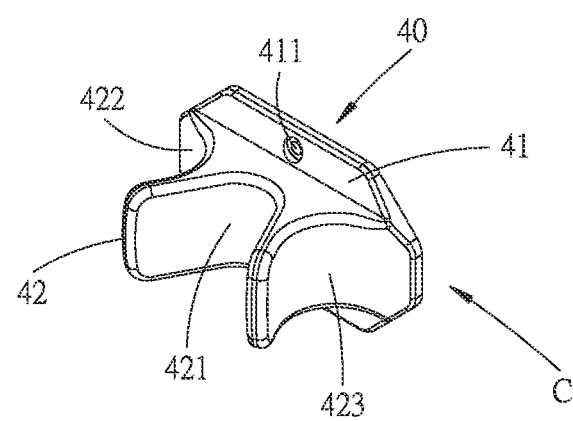
FIG. 2 is a perspective view of an auxiliary holder of the bicycle stand in accordance with the preferred embodiment of the present invention.
Figure 3:
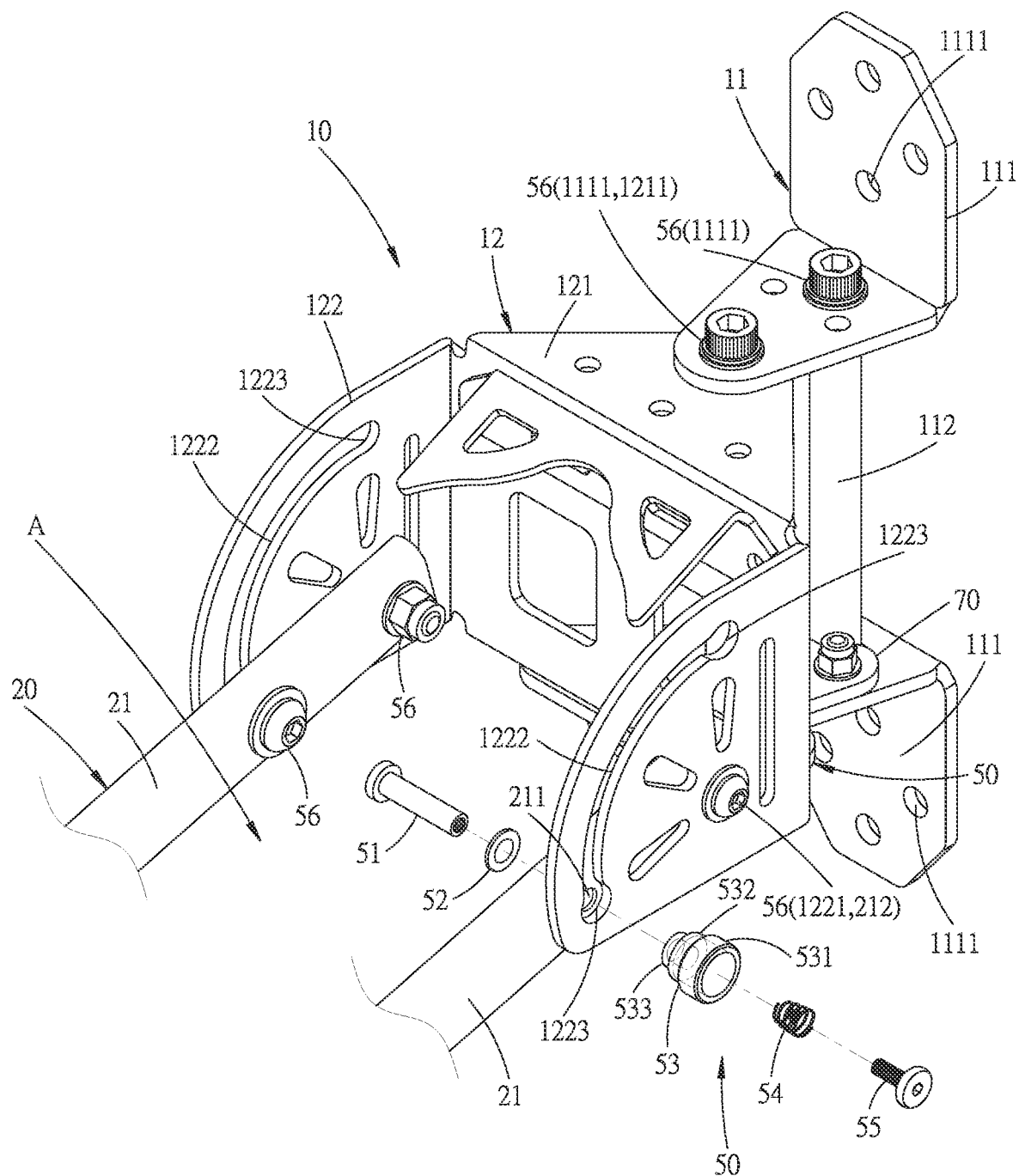
FIG. 3 is a partial exploded perspective view of the bicycle stand in accordance with the preferred embodiment of the present invention.

Referring to the drawings and initially to FIGS. 1-7, a bicycle stand 100 in accordance with the preferred embodiment of the present invention comprises a base unit 10, a first positioning rack 20, a second positioning rack 30, two movable pull shaft units 50, multiple positioning pivot bolts 56, and multiple fastening members 60.

The base unit 10 includes a base 11 and a support seat 12 pivotally connected with the base 11. The support seat 12 is pivoted relative to the base 11 axially and horizontally. The support seat 12 includes a pedestal (or bearer or brace or seating) 121 and two ears 122. The two ears 122 are located at two opposite sides of the pedestal 121. Each of the two ears 122 has a first end connected with the pedestal 121 and a second end provided with a limit slot 1222. The limit slot 1222 has an arcuate shape and has two ends each provided with a stop groove 1223. A receiving space is defined axially and longitudinally between the two ears 122.

The first positioning rack 20 is pivotally mounted between the two ears 122 of the support seat 12. The first positioning rack 20 includes two rods 21 and a link 22. The two rods 21 are parallel with each other. Each of the two rods 21 has a first end pivotally connected with one of the two ears 122 of the support seat 12 and a second end connected with the link 22. The first end of each of the two rods 21 is served as a positioning end that slides upward and downward along the limit slot 1222, and the second end of each of the two rods 21 is served as a free end that is rotated upward and downward. The link 22 is located between the two rods 21. A first holding area A is defined between the two rods 21 of the first positioning rack 20.

The second positioning rack 30 is pivotally mounted on the first positioning rack 20 and is distant from the base unit 10. The second positioning rack 30 includes a pivot shaft (or fixed rod) 31, a rotation frame (or holder or bracket) 32, and two locating pieces 33. The pivot shaft 31 is rotatably mounted on the first positioning rack 20 and located beside the link 22. The rotation frame 32 is connected with the pivot shaft 31. The rotation frame 32 has an L-shaped profile. The two locating pieces 33 are located at two sides of the rotation frame 32 and are mounted on the pivot shaft 31. The pivot shaft 31 is connected between the two locating pieces 33. The rotation frame 32 of the second positioning rack 30 forms a second holding area B.

A first one of the two movable pull shaft units 50 is mounted on a pivotal connection of the base 11 and the support seat 12 of the base unit 10, and controls and adjusts a leftward and rightward movement of the support seat 12 relative to the base 11 axially and horizontally. A second one of the two movable pull shaft units 50 is mounted on a pivotal connection of the positioning end of one of the two rods 21 of the first positioning rack 20 and the limit slot 1222 of one of the two ears 122 of the support seat 12, and controls and adjusts an upward and downward movement of the first positioning rack 20 relative to the support seat 12 of the base unit 10 axially and longitudinally.

In the preferred embodiment of the present invention, the base 11 of the base unit 10 includes two fixed brackets (or blocks) 111 and a support post 112 mounted between the two fixed brackets 111. Each of the two fixed brackets 111 has an L-shaped profile. The two fixed brackets 111 are located opposite to each other and are arranged symmetrically. Each of the two fixed brackets 111 is provided with multiple through holes 1111 for affixing each of to the two fixed brackets 111 to a wall. The two fixed brackets 111 are secured to two ends of the support post 112 by the positioning pivot bolts 56.

In the preferred embodiment of the present invention, the pedestal 121 has a U-shaped profile. Each of the two ears 122 is a vertical plate having a sector shape. The two ears 122 are directed toward a direction opposite to that of the pedestal 121.

In the preferred embodiment of the present invention, the bicycle stand further comprises an auxiliary holder 40 located under and spaced from the base unit 10. The auxiliary holder 40 is provided with a first stop face 421, a second stop face 422, and a third stop face 423.

In the preferred embodiment of the present invention, the auxiliary holder 40 has a fixed portion 41 and a protruding stop block 42. The fixed portion 41 is provided with a through hole 411. The stop block 42 is provided with the first stop face 421, the second stop face 422, and the third stop face 423. Each of the first stop face 421, the second stop face 422, and the third stop face 423 has an arcuate recess. The auxiliary holder 40 is arranged under the base unit 10 and forms a third holding area C.

In the preferred embodiment of the present invention, the pedestal 121 is pivotally mounted between the two fixed brackets 111 of the base 11 horizontally and axially.

In the preferred embodiment of the present invention, the pedestal 121 has a top plate and a bottom plate each having multiple through holes 1211 aligning with the through holes 1111 of each of the two fixed brackets 111. One of the positioning pivot bolts 56 in turn extends through one of the through holes 1111 of each of the two fixed brackets 111 and one of the through holes 1211 of the pedestal 121, so that the pedestal 121 is pivotally connected with the two fixed brackets 111.

In the preferred embodiment of the present invention, a connecting piece 70 is mounted between the bottom plate of the pedestal 121 and one of the two fixed brackets 111. The connecting piece 70 is secured to one of the two fixed brackets 111. Thus, one of the positioning pivot bolts 56 in turn extends through one of the through holes 1111 of each of the two fixed brackets 111, the connecting piece 70, and one of the through holes 1211 of the pedestal 121.

Figure 4:
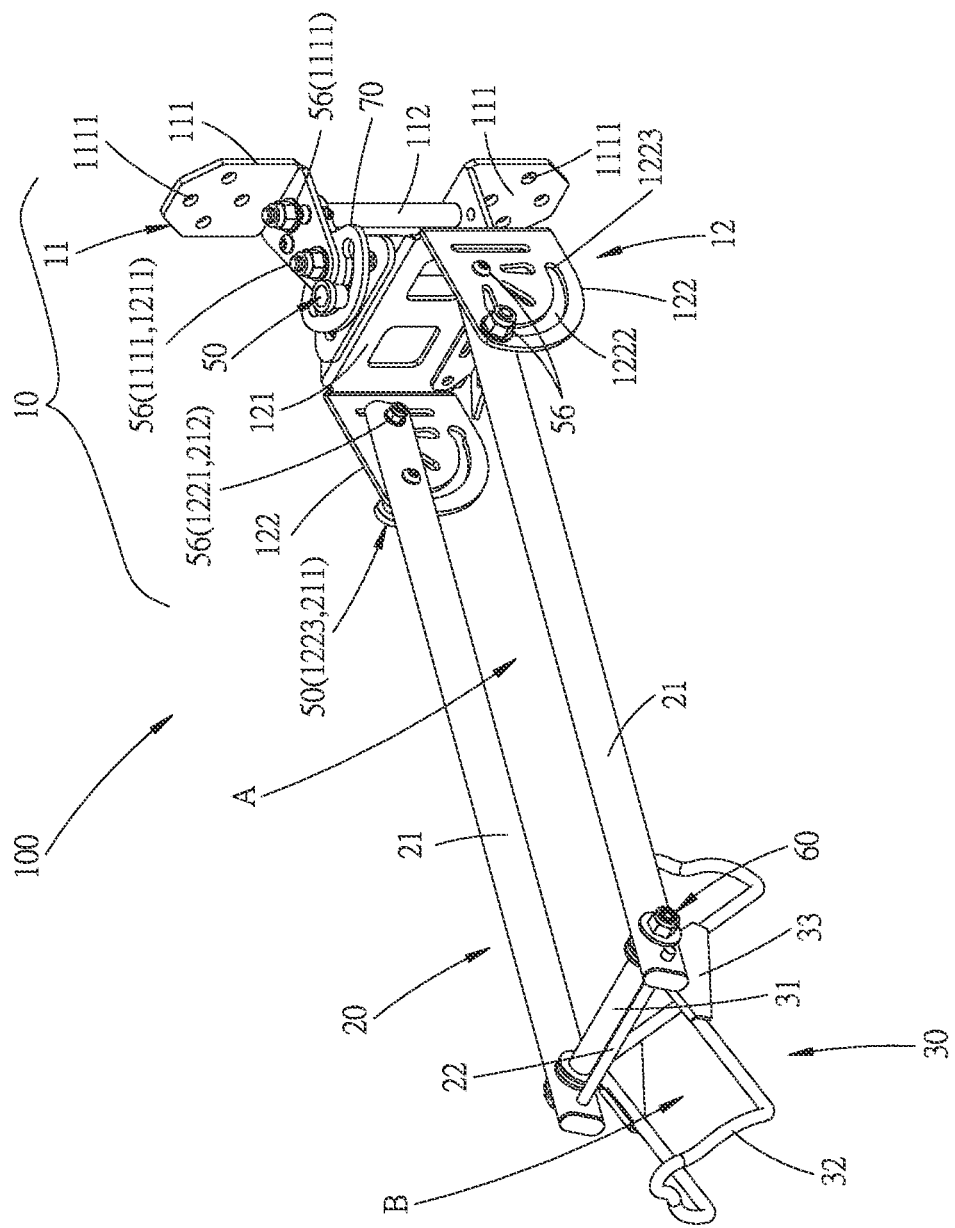
FIG. 4 is another perspective view of the bicycle stand in accordance with the preferred embodiment of the present invention.

In the preferred embodiment of the present invention, each of the two ears 122 has an axial hole 1221 (see FIG. 4). The first end of each of the two rods 21 is provided with an axial hole 212 (see FIG. 4) and a through hole 211 (see FIG. 3). The axial hole 212 is pivotally connected with the axial hole 1221 by one of the positioning pivot bolts 56 so that each of the two rods 21 is pivotally connected with each of the two ears 122. The through hole 211 of one of the two rods 21 is connected with the limit slot 1222 of one of the two ears 122 by the second one of the two movable pull shaft units 50, and the through hole 211 of the other one of the two rods 21 is connected with the limit slot 1222 of the other one of the two ears 122 by one of the positioning pivot bolts 56.

In the preferred embodiment of the present invention, each of the two movable pull shaft units 50 includes an internal threaded rod 51, a washer 52, a hollow locking member 53, a spring 54, and an external threaded rod 55. The locking member 53 has a first annular section 531, a second annular section 532, and a third annular section 533. The first annular section 531 has a diameter more than that of the stop groove 1223 and that of the limit slot 1222. The second annular section 532 has a diameter less than that of the stop groove 1223 and more than that of the limit slot 1222. The third annular section 533 has a diameter less than that of the stop groove 1223 and that of the limit slot 1222. The internal threaded rod 51 in turn extends through the washer 52, the through hole 211 of one of the two rods 21, the limit slot 1222 of one of the two ears 122, the locking member 53, and the spring 54, and the external threaded rod 55 is screwed onto the internal threaded rod 51. At this time, the first annular section 531 is stopped by an outer wall of the limit slot 1222, the second annular section 532 is locked in the stop groove 1223, and the third annular section 533 is inserted into the through hole 211 of one of the two rods 21, so that one of the two rods 21 is releasably locked by the locking member 53. Thus, the first positioning rack 20 is positioned by the second one of the two movable pull shaft units 50.

On the other hand, the connecting piece 70 is mounted between the bottom plate of the pedestal 121 and one of the two fixed brackets 111. The first one of the two movable pull shaft units 50 is mounted on the connecting piece 70 and is detachably locked in one of the through holes 1211 of the pedestal 121, so that the pedestal 121 is positioned by the first one of the two movable pull shaft units 50.

In assembly, one of the positioning pivot bolts 56 in turn extends through one of the through holes 1111 of each of the two fixed brackets 111 and one of the through holes 1211 of the pedestal 121, so that the pedestal 121 is pivotally connected with the two fixed brackets 111. Thus, the support seat 12 is pivoted axially and horizontally and is moved relative to the base 11 20 rightward or leftward. At this time, the first one of the two movable pull shaft units 50 is detachably locked in one of the through holes 1211 of the pedestal 121, so that the pedestal 121 is positioned by the first one of the two movable pull shaft units 50. Then, the axial hole 212 of each of the two rods 21 is pivotally connected with the axial hole 1221 of each of the two ears 122 by one of the positioning pivot bolts 56 so that each of the two rods 21 is pivotally connected with each of the two ears 122. Thus, the first positioning rack 20 is pivoted vertically and longitudinally and is moved relative to the support seat 12 of the base unit 10 upward or downward. At this time, the through hole 2111 of one of the two rods 21 is connected with the limit slot 1222 of one of the two ears 122 by the second one of the two movable pull shaft units 50, and the through hole 211 of the other one of the two rods 21 is connected with the limit slot 1222 of the other one of the two ears 122 by one of the positioning pivot bolts 56. Thus, the first positioning rack 20 is positioned by the second one of the two movable pull shaft units 50. Then, the fastening members 60 extend through the through holes 1111 to affix each of the two fixed brackets 111 to the wall. Finally, the auxiliary holder 40 located under and spaced from the base unit 10.

Figure 5:
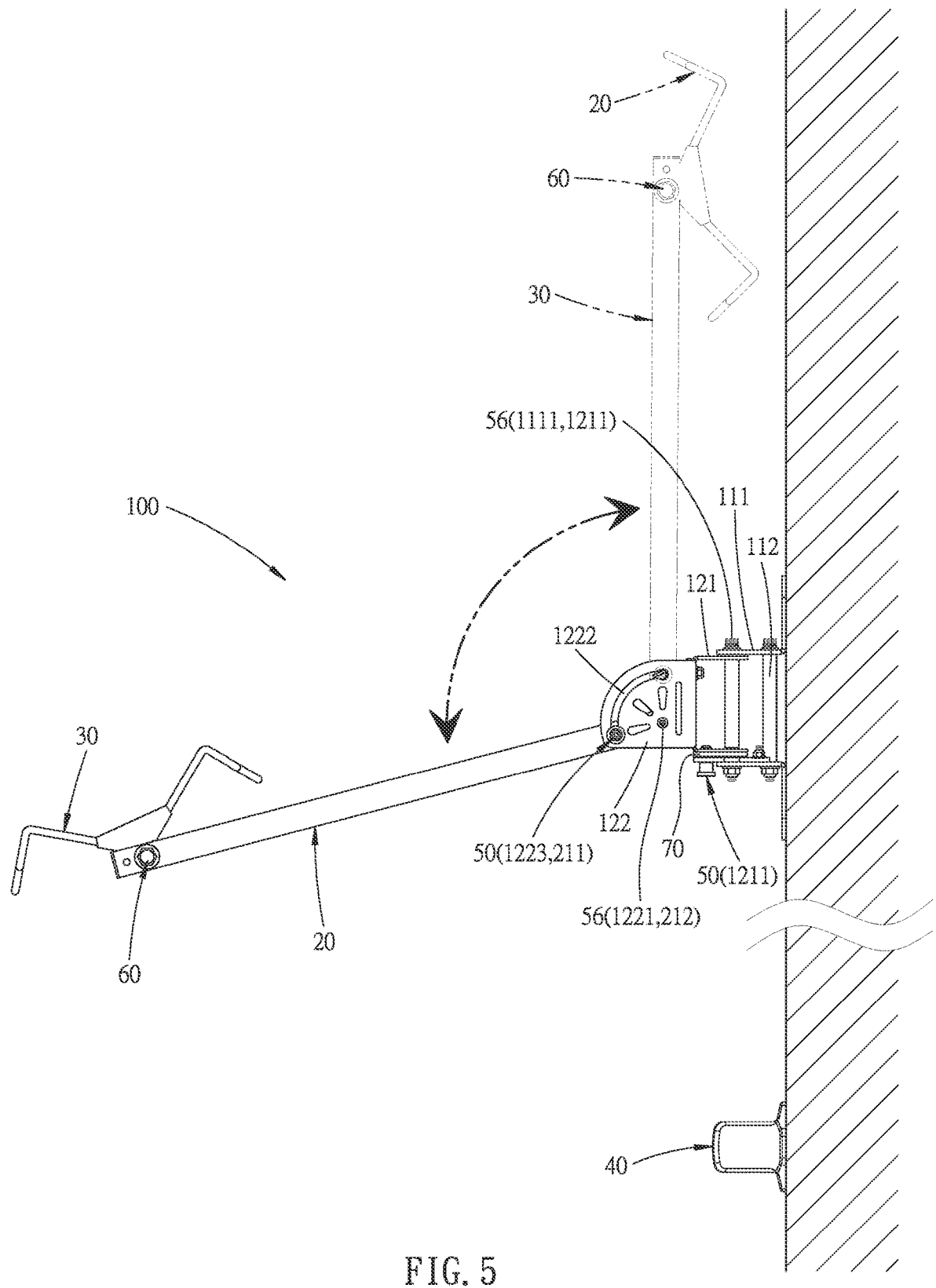
FIG. 5 is a first schematic operational view of the bicycle stand in accordance with the preferred embodiment of the present invention.

Referring to FIG. 5 with reference to FIGS. 1-4, when the third annular section 533 is moved and detached from the through hole 211 of one of the two rods 21 by pulling the locking member 53, the second annular section 532 is detached from the stop groove 1223, so that the first positioning rack 20 20 is unlocked from the second one of the two movable pull shaft units 50. Thus, the first positioning rack 20 is moved relative to the support seat 12 of the base unit 10 upward to a folded position or downward to an expanded position. At this time, the third annular section 533 is moved in the limit slot 1222 of one of the two ears 122, so that the second one of the two movable pull shaft units 50 is guided and moved along the limit slot 122.2 of one of the two ears 122.

Figure 6:
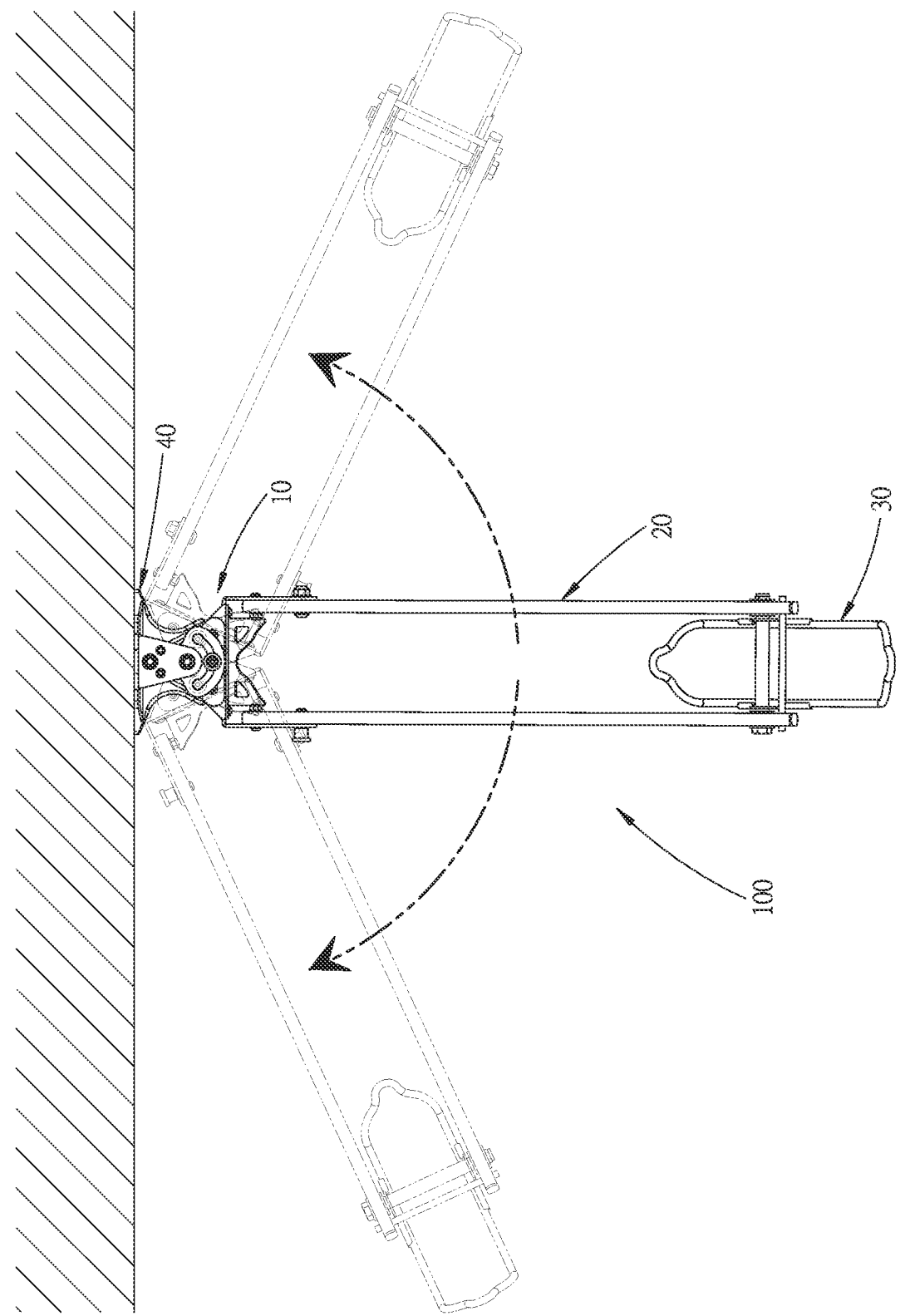
FIG. 6 is a second schematic operational view of the bicycle stand in accordance with the preferred embodiment of the present invention.

Referring to FIG. 6 with reference to FIGS. 1-4, when the pedestal 121 is unlocked from the first one of the two movable pull shaft units 50, the support seat 12 is pivoted axially and horizontally and is moved relative to the base 11 rightward or leftward to change the angle of the first positioning rack 20.

Figure 7:
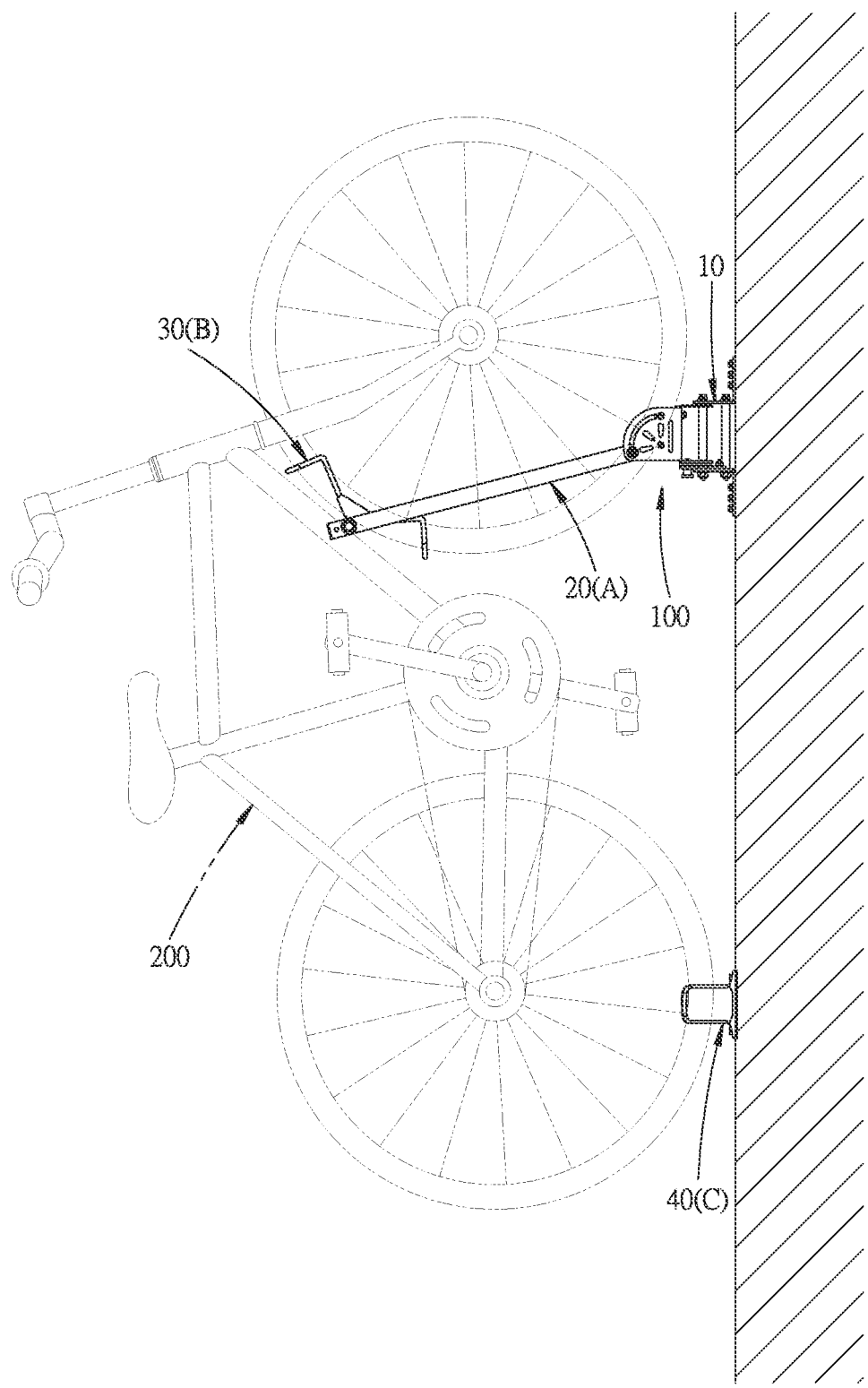
FIG. 7 is a third schematic operational view of the bicycle stand in accordance with the preferred embodiment of the present invention.

Referring to FIG. 7 with reference to FIGS. 1-4, the first positioning rack 20 is disposed at the expanded position for placing a bicycle 200. The bicycle 200 has a front wheel placed on the first holding area A defined between the two rods 21 of the first positioning rack 20 and the second holding area B formed by the rotation frame 32 of the second positioning rack 30. Thus, the front wheel of the bicycle 200 is disposed between the two rods 21 of the is first positioning rack 20. At this time, the front side of the rotation frame 32 is pressed by the front wheel of the bicycle 200 to rotate the pivot shaft 31 so that the rotation frame 32 is rotated forward, and the rear side of the rotation frame 32 is moved forward to press the front wheel of the bicycle 200. Thus, the front wheel of the bicycle 200 is supported by the first holding area. A of the first positioning rack 20 and the second holding area B of the second positioning rack 30. The bicycle 200 has a rear wheel placed on the first stop face 421 of the auxiliary holder 40. Thus, the rear wheel of the bicycle 200 is supported by the third holding area C of the auxiliary holder 40. In such a manner, the first positioning rack 20, the second positioning rack 30, and the auxiliary holder 40 form a three-point support so that the bicycle 200 is placed on the bicycle stand 100 steadily and stably without swaying.

Figure 8:
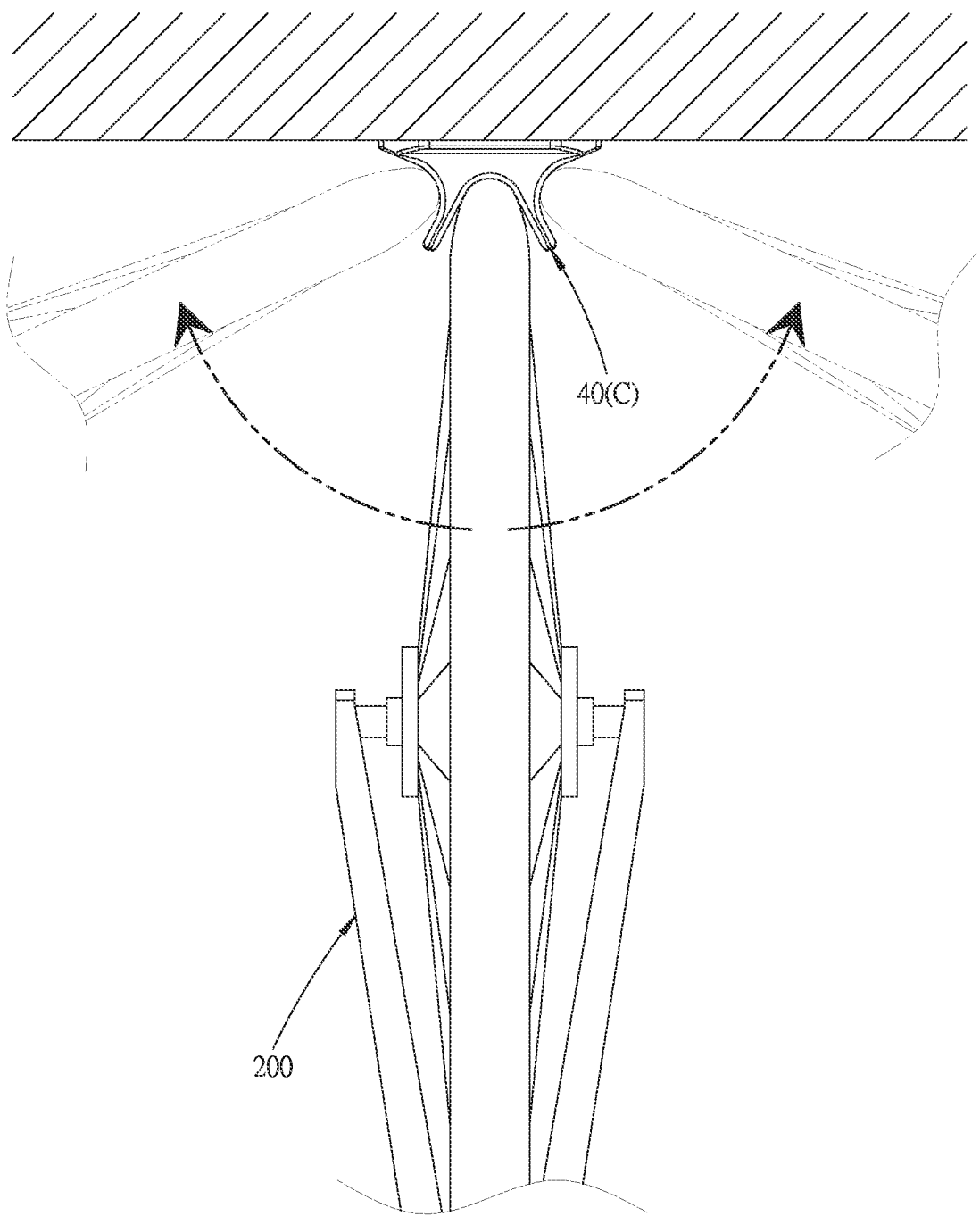
FIG. 8 is a fourth schematic operational view of the bicycle stand in accordance with the preferred embodiment of the present invention.

Referring to FIG. 8 with reference to FIGS. 1-4, when the pedestal 121 is unlocked from the first one of the two movable pull shaft units 50, the support seat 12 is moved relative to the base 11 leftward or rightward to change the angle of the first positioning rack 20 so that the rear wheel of the bicycle 200 is placed on the second stop face 422 or the third stop face 423 of the auxiliary holder 40.

Accordingly, the support seat 12 is pivoted horizontally and is moved relative to the base 11 rightward or leftward to change the angle of the first positioning rack 20 so that the angular position of the first positioning rack 20 and the second positioning rack 30 is adjusted according to the user's requirement. In addition, the first positioning rack 20 is pivoted relative to the support seat 12 of the base unit 10 upward and downward so that the first positioning rack 20 is moved upward to a folded position or downward to an expanded position. Further, when the first positioning rack 20 is disposed at the expanded position, the first holding area A of the first positioning rack 20, the second holding area B of the second positioning rack 30, and the third holding area C of the auxiliary holder 40 form a three-point support so that the bicycle 200 is placed on the bicycle stand 100 steadily and stably without swaying. Further, the bicycle stand 100 will not hook or tear the wheel rim or tire valve of the bicycle 200. Further, when the bicycle stand 100 is not in use, the first positioning rack 20 is disposed at the folded position and parallel with the wall, to reduce the volume and save the storage space of the bicycle stand 100.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A bicycle stand comprising:
a base unit, a first positioning rack, a second positioning rack, and two movable pull shaft units;
wherein:
the base unit includes a base and a support seat pivotally connected with the base,
the support seat is pivoted relative to the base axially and horizontally.
the support seat includes a pedestal and two ears;
each the two ears has a first end connected with the pedestal and a second end provided with a limit slot;
the limit slot has an arcuate shape and has two ends each provided with a stop groove;
a receiving space is defined axially and longitudinally between the two ears;
the first positioning rack includes two rods and a link;
the two rods are parallel with each other;
each of the two rods has a first end pivotally connected with one of the two ears of the support seat and a second end connected with the link;
the first end of each of the two rods is served as a positioning end that slides upward and downward along the limit slot, and the second of each of the two rods is served as a free end that is rotated upward and downward;
the link is located between the two rods;
a first holding area is defined between the two rods of the first positioning rack;
the second position rack is mounted on the first positioning rack and is distant from the base unit;
the second positioning rack includes a pivot shaft, a rotation frame, and two locating pieces;
the pivot shaft is mounted on the first positioning rack and located beside the link;
the rotation frame is connected with the pivot shaft;
the two locating pieces are located at two sides of the rotation frame and are mounted on the pivot shaft;

the rotation frame of the second positioning rack forms a second holding area;

a first one of the two movable pull shaft units is mounted on a pivotal connection of the base and the support seat of the base unit, and controls and adjusts a leftward and rightward movement of the support seat relative to the base axially and horizontally; and a second one of the two movable pull shaft units is mounted on a pivotal connection of the positioning end of one of the two rods of the first positioning rack and the limit slot of one of the two ears of the support seat, and controls and adjusts an upward and downward movement of the first positioning rack relative to the support seat of the base unlit axially and longitudinally.

2. The bicycle stand as claimed in claim 1, wherein:
the base of the base unit includes two fixed brackets and a support post mounted between the two fixed brackets;
each of the two fixed brackets has an L-shaped profile;
the two fixed brackets are located opposite to each other and are arranged symmetrically; and
each of the two fixed brackets is provided with multiple through holes for affixing each of the two fixed brackets to a wall.

3. The bicycle stand as claimed in claim 1, wherein:
the pedestal has a U-shaped profile;
each of the two ears is a vertical plate having a sector shape; and
the two ears are directed toward a direction opposite to that of the pedestal.

4. The bicycle stand as claimed in claim 1, further comprising:
an auxiliary holder located under and spaced from the base unit;
wherein the auxiliary holder is provided with a first stop face, a second stop face, and a third stop face.

* * * * *